United States Patent [19]

Kobayashi et al.

[11] 3,930,807

[45] Jan. 6, 1976

[54] PLASTIC MOLDING HAVING SATIN FINISH TYPE METALLIC LUSTER

[75] Inventors: Tatsumi Kobayashi, Yokohama; Tadashi Ito, Toride; Yoshihide Kamei, Kamakura; Teruhisa Oda, Sagamihara; Toshio Matsuki, Machidn, all of Japan

[73] Assignee: Canon Kabushiki Kaisha, Japan

[22] Filed: Apr. 24, 1974

[21] Appl. No.: 463,834

[30] Foreign Application Priority Data

Apr. 25, 1973 Japan ............................... 48-46981

[52] U.S. Cl. ..................... 29/195; 204/38 B; 204/29

[51] Int. Cl.[2] ........................................ B32B 15/08

[58] Field of Search ............ 29/195 P; 204/29, 38 B

[56] References Cited

UNITED STATES PATENTS

| | | | |
|---|---|---|---|
| 3,479,160 | 11/1969 | Klinger et al. | 29/195 |
| 3,496,623 | 2/1970 | Childers et al. | 29/195 |
| 3,527,579 | 9/1970 | Cines | 29/195 |
| 3,558,290 | 1/1971 | Baier et al. | 29/195 |
| 3,661,538 | 5/1972 | Brown et al. | 29/195 |
| 3,681,209 | 8/1972 | Campbell et al. | 204/30 |
| 3,771,977 | 11/1973 | Liu | 29/195 |

*Primary Examiner*—L. Dewayne Rutledge
*Assistant Examiner*—E. L. Weise
*Attorney, Agent, or Firm*—Fitzpatrick, Cella, Harper & Scinto

[57] ABSTRACT

The present invention relates to a plastic molding having satin finish type metallic luster. More particularly, it provides a molding of high accuracy and good appearance. The plastic molding of the present invention is produced by first applying satin finishing to the surface of the molding, providing a conductive coating thereon, applying polishing treatment on the surface of the coating, and forming a metal film thereon by metal plating.

6 Claims, No Drawings

PLASTIC MOLDING HAVING SATIN FINISH TYPE METALLIC LUSTER

BACKGROUND OF THE INVENTION

1. Field of the Invention

This invention relates to plastic molding having satin finish type metallic luster.

2. Description of the Prior Art

Satin finishing has been applied to the surface of metallic article so as to provide good appearance thereto. The treatment is carried out using abrasive grains such as iron powder, glass powder, silicon oxide, carborundum, alumina and the like.

The treatment can be easily carried out and no technical difficulties have been encountered. However, in the satin finishing of articles other than metallic articles, there have been many problems to be solved.

The typical one is the satin finishing of plastic articles. Recently, plastic molding has been plated so as to coat the surface thereof with a metal so that the molding may be provided with metallic appearance. The satin finish is applied to the metal coating and thus a plastic molding having satin finish type metallic luster is obtained.

For the satin finishing of plastic molding, two methods have been conventionally employed. One of them is a method in which the surface of plastic molding is roughened by a mixture of chromic acid, sulfuric acid, and phosphonic acid, is subjected to pre-treatment by stannous chloride $SnCl_2$) and palladium chloride, is provided with a conductive layer (for instance by applying chemical plating using metallic salt solution with a reductant dissolved therein), and is provided with a metal film of proper thickness (for example, several to ten microns; by applying electric plating using acid copper salt plating bath) to thereby produce a satin finish type metallic luster thereon. In order to provide desired appearance, plating using nickel, chromium, gold, rhodium and the like may be applied. This method is of practical value in the satin finishing, but there are many problems to be solved.

The metal coating should be set to a thickness sufficient to be durable to the satin finish, i.e., generally more than $20\mu$. Thus, the formation of the metal film requires a long period, e.g., 0.5 to 1 hours, which is not preferred from the economic point of view. Furthermore, there occurs a problem that there are produced uneven portions because of difference of current density during plating, e.g. thin portion is about $20\mu$ thick and thick portion is about $200\mu$ thick. Such unevenness of the metal film reduces accuracy and appearance, thereby seriously deteriorating the product value. Moreover, since the satin finish is applied after formation of metal film, the molding is deformed (since metal is of high malleability and the abrasive grain is sprayed thereon). In addition, a part of the metal film is often peeled off, and thus appearance and accuracy of the finished product is deteriorated. For these reasons, the above method is not applicable to a plastic molding for which good appearance and accuracy is required.

According to the other method, the satin finishing is applied directly to a plastic article to form a conductive coating thereon and then a metal film is formed on the coating by electric plating. This method can avoid the foregoing defects such as the limited thickness and the deformation of metal film, and the like. However, since the treatment is applied directly on the molding, there occurs other problems and it is not possible to produce excellent finished product. That is, since plastic molding has defects which are not visible such as weed mark, sink, stress during molding and the like, a finished product suffers from stain of conductive film, difference of luster, coarse surface and the like during the formation of conductive film. These defects cannot be removed by plating to the thickness of 10 to $15\mu$. Thus, the final product has stain, difference of luster and is coarse, an article having good appearance cannot be produced.

On the other hand, when plating is carried out to remove the defects to the thickness more than $20\mu$, the satin finish is made even or flat by the plating and a good satin finish can not be obtained.

SUMMARY OF THE INVENTION

This invention is to provide a novel satin finishing technique whose use results in the formation of a product having a good appearance and accuracy, and to provide a plastic molding having satin finish metallic luster whose possibility of being applied to all the industrial fields is markedly improved.

The second object of this invention is to reduce production cost for producing the plastic article and to simplify the process.

This invention is characterized in that a plastic molding having satin finish type metallic luster is produced by applying a satin finishing on the surface of a plastic molding to form fine concave and convex grooves thereon, applying a chemical plating to form a conductive coating on the satin finished surface, applying a polishing treatment by mechanical friction to make the surface of the conductive coating even or flat and applying a metal plating to form a metal film on the conductive film. This invention is based upon the fact that a conductive coating is provided after applying a satin finishing directly on a plastic molding and a polishing treatment by mechanical friction is applied, and thus a final product prepared by applying metal plating has an ideal satin finish type metallic luster.

The technical feature of the present invention resides in polishing treatment and the desired object can be attained by applying the polishing treatment on the conductive coating.

The reason why soft and fine satin finish can be obtained by the polishing treatment is not clear, but it is confirmed that uneven defects such as stain of the conductive layer, uneven brightness, coarseness and the like can be removed by the polishing treatment and thus the desired final product having satin finish can be obtained. As stated above, the aforementioned drawbacks of conductive coating are caused by those defects of plastic article, but where the polishing treatment is applied before or after the satin finishing, a soft and fine satin finish cannot be obtained. Moreover, where the polishing treatment is applied prior to the formation of the conductive film, the desired satin finish cannot be obtained. Thus, the polishing treatment of the present invention is required to be applied to the conductive coating. The conductive coating is formed by chemical plating and the educion and its density of metal vary according to the surface roughness of plastic molding and the surface activity thereof. It is considered that the unevenness of conductive coating indirectly brought about by the above variation can be removed by polishing treatment. The effect of the polishing treatment can be confirmed at the formation of metal film and it cannot be confirmed just after the polishing treatment. The reason is that the levelling of the conductive coating is a phenomenon in the order of microns.

The advantages brought about by the practice of this invention are that the formation of metal film for satin finishing is not needed and a metal film having the desired luster can be formed by plating, and thus a great reduction of production cost is possible. Moreover, since it is made physically, a metal film of uniform thickness can be formed in the formation by electric plating. Hence, the thickness of metal film is limited only by the use of the product and it does not suffer from the limitation of its being employed for covering the surface defects of the conductive coating. For instance, when the polishing treatment is not applied, the film thickness of at least 30$\mu$ is required while the thickness of at least 5$\mu$ is sufficient in the present invention. The satin finishing is generally carried out by spraying the abrasive grain. The size of the abrasive grain can be determined depending upon the satin finish to be obtained and it is generally in the range of 80 to 150 mesh. The abrasive grains include iron powder, glass powder, silicon oxide, carborundum, alumina powder and the like. The jetting of the abrasive grain is carried out at pressures of 1 to 5 kg/cm$^2$.

In one of the other satin finishing methods, abrasive grain is dispersed in a liquid and a plastic article is rotated in the dispersion. In addition, there may be used other conventional methods in which an article is dipped in an organic solvent to dissolve the surface thereof, or an article is dipped in an organic solvent to bring it in a half-melted state and then it is dipped in a non-solvent to harden the half melted state.

The formation of the conductive coating is carried out by pre-treatment for chemical plating and then by chemical plating. The pre-treatment is carried out to educe uniformly metal on the surface of the resin. They are carried out by conventional methods. Those methods are described in "Electroless plating" pages 151–164, published by Asakura Shoten. This invention is explained with reference to typical methods.

An article is dipped in an etching solution containing a major portion of chromic acid to form fine roughness on the surface thereof. In case of ABS resin, rubber component is dissolved in the grooves to increase anchor action and mainly increase adhesion strength. The —C═C— portion of the resin is oxidized to —COO and —CN group is oxidized to —CONH$_2$ and further to —COO by chromic acid. Thus, the surface of the resin is made more hydrophilic and capability for chemically bonding is enhanced. Plastic article is treated with a mixture of anhydrous chromic acid and sulfuric acid or a mixture of anhydrous chromic acid, sulfuric acid and phosphoric acid. The treatment is referred to as surface roughtening treatment.

In order to facilitate chemical plating on a resin surface, the resin surface is activated by distributing fine particles of palladium of high catalytic activity uniformly on the resin surface. That is, the article is dipped in a solution of stannic chloride to deposit reductive $Sn^{2+}$ thereof, and then it is dipped in palladium chloride solution to deposit palladium by reduction effect of $Sn^{2+}$ as deposited previously. Hence, the article is treated in a mixed solution of stannic chloride 10g/l and hydrochloric acid 40 ml/l and in a mixed solution of palladium chloride solution 0.5g/l and hydrochloric acid 10m l/l. Thereafter, it is subjected to chemical plating in a chemical plating bath to educe conductive coating thereon. Although the ingredients contained in the chemical plating bath vary depending upon the kind of plating, the main components are nickel sulfate, sodium citrate, sodium hypophosphite and sodium acetate. For instance, the composition of plating bath for educing copper is as follows:

| | |
|---|---|
| Copper sulfate | 29g/l |
| Sodium carbonate | 25g/l |
| Potassium sodium tartrate | 140g/l |
| EDTA triethanol amine | 17g/l |
| Caustic soda | 40g/l |
| 37% Formalin liquid | 166g/l |

The composition of plating liquid for educing copper is as follows:

| | |
|---|---|
| Nickel sulfate | 35g/l |
| Sodium citrate | 10g/l |
| Sodium acetate | 10g/l |
| Sodium hypophosphite | 15g/l |
| Magnesium sulfate | 20g/l |

Metals usable for forming the conductive coating although limited to those, include copper, nickel, silver and the like. Preferred thickness of the conductive coating is in the range of 0.2 to 25$\mu$ and more particularly 0.2 to 10$\mu$. When the conductive coating is made from nickel, the range of 0.2 to 0.5$\mu$ is preferred. In this invention, chemical plating treatment means chemical plating including pre-treatment.

The polishing treatment is intended to make the conductive coating even or flat and is carried out under the conditions that the already formed satin finished surface is protected from deterioration and peeling of the conductive coating is prevented. In this sense, necessary conditions are set. The conditions of polishing treatment should be determined depending upon the kind and form of plastic molding and the kind and form of the conductive coating. Thus, the polishing treatment is a mechanical friction to secure formation of uniform metal film in the formation of metal film in the stage of chemical plating and is carried out to such extent that fine satin finish can be prevented from deterioration and peeling of the conductive coating is prevented.

As the polishing treatment, spraying of abrasive grain, such as polishing by blast machine is employed (of course, in this case, there are employed more moderate conditions than in the satin finishing, i.e. it is carried out by lower spraying pressure in barrel or by rotation together with polishing liquid containing abrasive grain). That is, there are employed conventional mechanical polishing treatments such as polishing by barrel, liquid honing in which abrasive grain is sprayed together with water and compressed air.

After the polishing treatment, a metal film is formed by chemical plating.

The plating is carried out using any metal so as to provide the desired appearance to the product. The metal film is usually formed by metal plating using chromium, gold, rhodium and the like. Particularly, a metal film prepared by nickel plating followed by chromium plating is preferred. Electric plating is carried out by conventional methods. Preferred thickness of the metal film is set to 5 to 20$\mu$, particularly 5$\mu$ to 15$\mu$.

It is to be noted that addition and modification can be applied to the embodiment as described above. For instance, the formation of metal film may be carried out using the same metal as the conductive coating. And the metal film may be formed by the method for forming the conductive coating. By chemical plating method used for the formation of conductive coating, the pre-treatment for chemical plating can be deleted. Moreover, the metal film may be composed of two kinds of metal films.

The plastic molding having the satin finish metallic luster may have the fine satin finish of the order of 3 to 5μ. Thus, the use of plastic molding can be markedly developed. Particularly, application thereof to super precision apparatus for which soft and fine satin finish and hitting accuracy are required, can be expected.

EXAMPLE 1

A rewind nob shaft holder for steel camera made from ABS resin (trade name: Kaneace S-10) was subjected to satin finish treatment with a blast machine, iron powder of 100 mesh, and at 2600 R.P.M. to provide chemical plating thereon and then it was subjected to barrel finishing with spherical plastic media of 2m/m diameter compound of E7 on the market (Torowahl) in a barrel machine. The article was applied to plating rack and was subjected to nickel plating of $4A/dm^2$ for 10 minutes to form a layer of 10μ and then chromium plating of $20A/dm^2$ in Sargent bath for 2 minutes to form a layer of 0.2μ thickness. Then a good satin finish having neither stain nor uneven brightness was obtained.

Generally, satin finish of super-precision apparatus is required to have peak to peak width of 30 to 100μ and depth of 5 to 8μ. The satin finish as obtained in this example has a depth of 5μ and peak to peak width of 80μ, and it can be satisfactorily used as a superprecision apparatus.

EXAMPLE 2

ABS resin was subjected to satin finishing with dry blast machine of $1.5kg/cm^2$ air pressure using aluminum abrasive grain of 100 mesh. After pre-treatment, it was dipped in a solution of 40g/l of nickel sulfate, 24g/l of sodium citrate, 20g/l of sodium hypophosphite, 14g/l of sodium acetate to form a nickel coating thereon.

After drying, the nickel coating was subjected to slight polishing with a dry blast machine of $1.0kg/cm^2$ air pressure using glass beads of 200 mesh. Then, it was provided with nickel coating of 10μ and chromium coating of 0.25μ by conventional method. Uniform satin finish having neither stain nor uneven brightness was obtained.

Surface roughness of the product is of H max 5μ (depth) and of good touching suitable for camera part.

EXAMPLE 3

An upper cover for camera of polypropyrene resin was subjected to liquid honing of $5kg/cm^2$ air pressure with a mixture of carborundum of 120 mesh. Then, after it was subjected to washing with neutral detergent, it was dipped in a solution of 17g/l of chromic acid, and 900g/l of sulfuric acid, and 300g/l of phosphoric acid at 70°C for 10 minutes and then it was subjected to conventional pre-treatment followed by chemical copper plating. After drying, the same liquid honing as applied to plastic resin was applied to the copper plated product (at air pressure of $2kg/cm^2$).

Then, nickel plating of 10μ and chromium plating of 0.25μ were provided. Then the upper cover for camera of uniform satin appearance having neither stain nor uneven brightness was obtained.

COMPARATIVE EXAMPLE 1

An plastic molding provided with a satin finish by the procedure of Example 2 was subjected to conduction treatment by conventional method. Then, it was plated in nickel plating bath having the following composition to obtain nickel coating of 10μ followed by chromium coating of 0.25μ.

| | |
|---|---|
| Nickel sulfate | 300g/l |
| Nickel chloride | 60g/l |
| Boric acid | 40g/l |
| Brightening agent I (manufactured by Murata Kagaku Co.) | 10g/l |
| Brightening agent II (manufactured by Murata Kagaku Co.) | 0.25g/l |

Where the thickness of nickel coating was increased to 20μ, stain and uneven brightness appearing on the surface thereof were slightly removed. However, by levelling effect of nickel coating, satin appearance was removed. Thus, finally, the appearance was substantially similar to that which was prepared by applying satin finishing onto the surface of plastic molding and then applying chemical plating.

COMPARATIVE EXAMPLE 2

Conductivity treatment was applied to plastic molding which was provided with satin finish by the procedure of Example 2 and then it was plated in nickel plating bath of the following composition to obtain 5μ of nickel coating.

| | |
|---|---|
| Nickel sulfate | 300g/l |
| Nickel chloride | 60g/l |
| Boric acid | 40g/l |
| Brightening agent I (manufactured by Murata Kagaku Co.) | 4g/l |
| Brightening agent II (manufactured by Murata Chemical Co.) | 0.25g/l |

This plating bath characterized by lowered levelling effect of nickel coating and thus there can be obtained a substantially nonlustrous nickel coating.

Then, it was dipped in a nickel bath of Comparative Example 1 to obtain nickel coating of 7μ. and then chromium coating of 0.25μ.

The thus obtained product had an appearance in which uneven brightness was removed by effect of nonlustrous nickel plating, but stain could not be removed and it was of no practical value.

We claim:

1. A metal-coated plastic molding having a satin finish type metallic luster comprising:

a. A plastic molding having a satin finish;

b. An intermediate electroless plated layer of electrically conductive material bonded to said satin finished base, said intermediate layer having a mechanically polished uniform surface; and c. An electroplated metal outer layer bonded to said intermediate layer.

2. A plastic molding according to claim 1 wherein said outer electroplated layer comprises a chromium layer overlying a nickel layer.

3. A plastic molding according to claim 1 wherein the thickness of the metal film is 5 to 20 $\mu$.

4. In the method for forming a plastic molding having a satin finish type metallic luster by applying satin finishing to the surface of the plastic molding to make the surface uneven, electrolessly applying a chemical plating to the satin surface to form a conductive coating, and applying an electroplated metal layer over said conductive coating, the improvement which comprises mechanically polishing the conductive coating to form a uniform surface thereon prior to applying said electroplated layer whereby the minimum thickness of said outer layer is about 5 microns, peeling tendencies of said conductive layer are reduced, and said satin finish is protected from deterioration during manufacture.

5. A plastic molding according to claim 4 wherein the satin finishing is carried out using an abrasive grain of 80 to 150 mesh.

6. A plastic molding according to claim 4 wherein the polishing treatment of the conductive coating is carried out using an abrasive grain.

* * * * *